US007950042B2

(12) United States Patent
Yousef

(10) Patent No.: US 7,950,042 B2
(45) Date of Patent: May 24, 2011

(54) FAST SWITCHING BETWEEN TIME DIVISION MULTIPLEXED (TDM) CHANNELS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 975 days.

(21) Appl. No.: 11/303,398

(22) Filed: Dec. 16, 2005

(65) Prior Publication Data

US 2007/0143810 A1    Jun. 21, 2007

(51) Int. Cl.
*H04N 7/173* (2006.01)
(52) U.S. Cl. ......................................... 725/131
(58) Field of Classification Search .................. 725/118, 725/135; 348/731, 732; 455/574
See application file for complete search history.

(56) References Cited

U.S. PATENT DOCUMENTS

| 5,642,153 | A  | * | 6/1997  | Chaney et al. ................... 725/40 |
| 6,469,990 | B1 |   | 10/2002 | Raaf |
| 6,907,028 | B2 | * | 6/2005  | Laiho et al. .................... 370/347 |
| 2003/0153369 | A1 | * | 8/2003  | Laiho et al. .................... 455/574 |
| 2005/0002416 | A1 | * | 1/2005  | Belotserkovsky et al. ... 370/465 |
| 2005/0125840 | A1 | * | 6/2005  | Anderson et al. ............. 725/118 |
| 2005/0138658 | A1 |   | 6/2005  | Bryan |
| 2005/0138659 | A1 | * | 6/2005  | Boccon-Gibod et al. ........ 725/58 |
| 2006/0104348 | A1 | * | 5/2006  | Chen et al. ............... 375/240.01 |
| 2007/0019578 | A1 | * | 1/2007  | Meiri ............................. 370/311 |
| 2007/0097272 | A1 | * | 5/2007  | Moradi et al. ................. 348/731 |

FOREIGN PATENT DOCUMENTS

| WO | WO 2004043073 A1 | * | 5/2004 |
| WO | WO 2005/060113 A1 | * | 6/2005 |
| WO | WO 2005060113 A1 | * | 6/2005 |

OTHER PUBLICATIONS

WO 2005060113 A1—Translation.*

* cited by examiner

*Primary Examiner* — Marivelisse Santiago-Cordero
*Assistant Examiner* — Munjal Patel
(74) *Attorney, Agent, or Firm* — Rahman LLC

(57) ABSTRACT

A system and method of reducing a channel switching delay in TDM mobile television systems comprises transmitting a sequence of data bursts associated with channels for reception on a RF channel bandwidth received on a mobile television receiver; switching between an active state of transmission and a non-active state of transmission during reception of channels on the RF channel bandwidth, wherein the active state of transmission comprises transmission of data bursts associated with user-preferred channels and the non-active state of transmission comprises transmission of data bursts associated with user non-preferred channels; anticipating a particular user-preferred channel that a user will likely switch to during reception of channels on the RF channel bandwidth; decoding the sequence of data bursts during the active state of transmission; buffering one decoded data burst for each of the user-preferred channels; and replacing a previously buffered data burst with a newly buffered data burst.

10 Claims, 8 Drawing Sheets

FAST SWITCHING BETWEEN TIME DIVISION MULTIPLEXED (TDM) CHANNELS

BACKGROUND

1. Technical Field

The embodiments of the invention generally relate to television (TV) technology, and, more particularly, to the transmission of and switching between television channels.

2. Description of the Related Art

Handheld devices with integrated digital television access are a relatively new phenomenon. Such technology has traditionally been limited by size, power consumption, and most importantly performance. Poor performance of such devices has typically been the result of the constantly changing receiver environment. More particularly, the quality of the received signal is affected by the device's ability to manage adjacent-channel rejection, low signal-to-noise ratios, and Doppler compensation, among other factors.

DVB-H is the specification for bringing broadcast services to handheld receivers, and was formally adopted as an ETSI (European Telecommunications Standards Institute) standard in November 2004. More specifically, DVB-H is a terrestrial digital TV standard that tends to consume less power than its predecessor, the DVB-T standard, and generally allows the receiver to move freely while receiving the signal transmission, thereby making it ideal for cellular phones and other mobile devices to receive digital TV broadcasting over the digiTV network, and hence without having to use cellular telephone networks.

In mobile TV DVB-H systems such as DVB-H (ETSI EN 301 192), one radio frequency (RF) channel is shared among many TV channels (TV programs). Generally, these TV channels are multiplexed either in the time domain or in the frequency domain. When the TV channels are multiplexed in the time domain, each channel is given full access to the entire RF channel bandwidth for a short period of time (burst duration). After the burst is transmitted, bursts for other channels occupy the RF channel and so on. This multiplexing process is referred to as time division multiplexing (TDM). FIG. 1 illustrates an example of time division multiplexing of 15 TV channels on one RF channel. In FIG. 1, the TV channels are labeled 1, 2, 3, ..., 15. In FIG. 1, it is shown that each TV channel occupies the entire RF channel for 1/15 of the total time. Generally, a receiver (not shown) which is receiving only one channel (for example, channel 2) only has to be active (ON) during the periods of channel 2 bursts. In order to conserve battery consumption, such a receiver will shut off its circuits when channel 2 bursts are not occupying the RF channel. Thus, the receiver enters into a SLEEP mode. This demonstrates that TDM of TV channels can help reduce power consumption of a receiver watching a single channel.

On the other hand, this tends to cause a problem when a user desires to switch to receive another TV channel on the same RF channel. One example is shown in FIG. 1, if a user desires to switch from channel 2 (currently viewed channel (VIEW)) to channel 3 (this process is denoted by channel UP in FIG. 1). The worst case scenario occurs when a user issues a command to switch to channel 3 immediately after the burst of channel 3 ends. In this case, the receiver has to wait until the next burst that belongs to channel 3 appears on the RF channel. This causes a user to wait for a given period of time denoted as the channel switching delay. Such a delay could be as long as 5 to 7 seconds in DVB-H systems, which detracts from the television viewing process as such a channel switching delay could be rather annoying to a user. Accordingly, there remains a need for a technique to reduce the channel switching delay in mobile television receivers.

SUMMARY

In view of the foregoing, an embodiment provides a method of reducing a channel switching delay in TDM mobile television systems, and a program storage device readable by computer, tangibly embodying a program of instructions executable by the computer to perform a method of reducing a channel switching delay in TDM mobile television systems, wherein the method comprises transmitting a sequence of data bursts associated with channels for reception on a RF channel bandwidth received on a mobile television receiver; switching between an active state of transmission and a non-active state of transmission during reception of channels on the RF channel bandwidth, wherein the active state of transmission comprises transmission of data bursts associated with user-preferred channels and the non-active state of transmission comprises transmission of data bursts associated with user non-preferred channels; anticipating a particular user-preferred channel that a user will likely switch to during reception of channels on the RF channel bandwidth; decoding the sequence of data bursts during the active state of transmission; buffering one decoded data burst for each of the user-preferred channels; and replacing a previously buffered data burst with a newly buffered data burst.

The buffering of the one decoded data burst for each of the user-preferred channels may be performed internal to the mobile television receiver. Alternatively, the buffering of the one decoded data burst for each of the user-preferred channels may be performed external to the mobile television receiver. The method may further comprise neglecting parity data bursts in the sequence of data bursts during the buffering process. Preferably, the parity data bursts are used in a forward error correction (FEC) process for removing errors from transmitted video received in the mobile television receiver. Also, the method may further comprise neglecting a first portion of each the data bursts during the buffering process.

The method may further comprise sharing existing memory storage in the mobile television receiver between a currently viewed channel and an immediately subsequent sequenced channel. Additionally, the method may further comprise using a Reed Solomon (RS) decoder and an input/output (I/O) circuit to empty the memory storage to enable memory sharing between the currently viewed channel and the immediately subsequent sequenced channel. Moreover, the method may further comprise using a multiprotocol encapsulation forward error correction (MPE-FEC) process on data associated with the currently viewed channel to utilize memory resources of the mobile television receiver; and transferring the data to a video decoder buffer external to the mobile television receiver. Also, the method may further comprise allocating equally spaced time slots between a currently viewed channel and each of an immediately subsequent sequenced channel and an immediately preceding sequenced channel.

Another embodiment provides a system for reducing a channel switching delay in a TDM mobile television, wherein the system comprises a host processor adapted to transmit a sequence of data bursts associated with channels for reception on a radio frequency (RF) channel bandwidth; a mobile television receiver adapted to receive the sequence of data bursts and the RF channel bandwidth; a switching component in the mobile television receiver, wherein the switching component is adapted to switch between an active state of transmission and a non-active state of transmission during reception of channels on the RF channel bandwidth, wherein the active state of transmission comprises transmission of data bursts associated with user-preferred channels and the non-active state of transmission comprises transmission of data bursts associated with user non-preferred channels; logic circuitry in the mobile television receiver, wherein the logic circuitry is adapted to anticipate a particular user-preferred channel that a user will likely switch to during reception of channels on the RF channel bandwidth; a decoder in one of the host processor and the mobile television receiver, wherein the decoder is adapted to decode the sequence of data bursts during the active state of transmission; a data buffer in one of the host processor and the mobile television receiver, wherein the data buffer is adapted to buffer one decoded data burst for each of the user-preferred channels; and a circuit in the mobile television receiver, wherein the circuit is adapted to replace a previously buffered data burst with a newly buffered data burst.

Preferably, the data buffer is adapted to neglect parity data bursts in the sequence of data bursts. Furthermore, the parity data bursts are preferably used in a FEC process for removing errors from transmitted video received in the mobile television receiver. Moreover, the data buffer may be adapted to neglect a first portion of each of the data bursts during the buffering process. Additionally, the mobile television receiver may be adapted to share existing memory storage in the mobile television receiver between a currently viewed channel and an immediately subsequent sequenced channel. The system may further comprise a RS decoder and an I/O circuit adapted to empty the memory storage to enable memory sharing between the currently viewed channel and the immediately subsequent sequenced channel. Preferably, the mobile television receiver is adapted to use a MPE-FEC process on data associated with the currently viewed channel to utilize memory resources of the mobile television receiver; and transfer the data to a video decoder buffer external to the mobile television receiver. Preferably, the host processor comprises a transmitter adapted to allocate equally spaced time slots between a currently viewed channel and each of an immediately subsequent sequenced channel and an immediately preceding sequenced channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
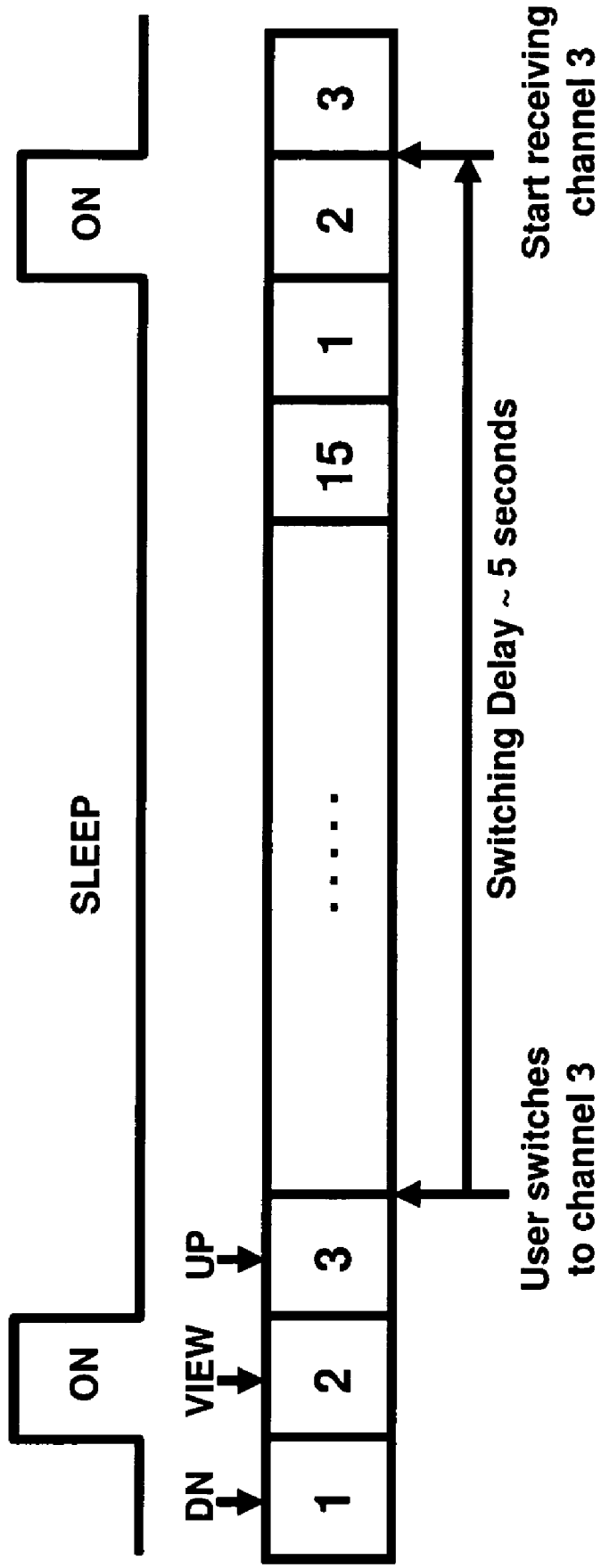
FIG. 1 is a schematic diagram illustrating channel switching delay in conventional TDM systems.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a technique to reduce the channel switching delay in mobile television receivers. The embodiments herein achieve this by providing a technique for reducing the channel switching delay in TDM systems by anticipating the channel switch and buffering one or part of a burst of the anticipated channel(s). The buffering could be accomplished inside or outside a receiver. Moreover, buffering requirements could be reduced by sharing the memory needed for the viewing channel with the buffered channel. Referring now to the drawings, and more particularly to FIGS. 2 through 8, where similar reference characters denote corresponding features consistently throughout the figures, there are shown preferred embodiments of the invention.

Generally, the embodiments of the invention provide techniques for reducing the channel switching delay in TDM mobile TV systems such as DVB-H and the MediaFlo™ System available from Qualcomm, Inc., California, USA, for example. In order to reduce the channel switching delay, the embodiments of the invention anticipate channel switching and buffer one burst from each anticipated channel. According to the embodiments of the invention, a receiver anticipates the channels that a user can switch to at any time. This may be accomplished by predicting typical user channel switching behavior such as switching up or down on the channel list provided to the user. Alternatively, it could be anticipated that the user can recall (i.e., jump to) the last channel he/she was watching. Still alternatively, the user could also program a general favorite list of channels, which represents channels of frequent or preferred viewing.

Knowing the favorite channels that are the most likely channels that the user needs to switch to, the receiver wakes up during the bursts of the favorite channels, and decodes the favorite channel bursts. The receiver buffers one burst of each favorite channel. When a new burst of a given favorite channel comes in, the receiver replaces the old stored burst with the new burst and so on. The burst storage could use internal memory in the receiver, or external memory that could exist in the host processor, for example (the host processor is responsible for decoding video and presenting it to the user).

The amount of memory needed to store one burst could be up to approximately 2 Mbit in DVB-H systems. If the receiver stores bursts for two favorite channels (for example channels up (UP) and down (DN)), it needs 2×2=4 Mbits of memory, which could be quite large if the storage is kept internally. Furthermore, this increases the power consumption of the receiver by approximately three times because the receiver needs to wake up and decode three bursts (one for the VIEW channel and two for the two anticipated channels). Thus, the power consumption will triple because the receiver is awake for three bursts and not only one.

The embodiments of the invention provide techniques to further reduce the amount of memory needed for the buffering of favorite channels. In a first embodiment, the reduction of the buffer size can be accomplished by neglecting the redundancy in the bursts and/or first portion of the data. The receiver can save buffer size and/or power consumption by not buffering and/or receiving redundant data bursts. Redundancy (parity) bits are used for forward error correction (FEC) as described in U.S. patent application Ser. No. 11/251,721 and entitled, "Error Detection and Correction in Data Transmission Packets," the complete disclosure of which, in its entirety, is herein incorporated by reference. In DVB-H systems, such redundancy bits are used to correct errors in the transmitted video, which might be caused by the channel. This redundancy typically accounts for one fourth of the burst (up to approximately 0.5 Mbit). The receiver could use the parity bits to correct errors in the burst and then neglect them or they might not receive them at the first place to save power consumption as well as buffer size. In DVB-H systems the burst is divided into two parts. One part is the data portion and the second part is the parity portion. The data portion is sent first and there is a specific flag that signals the end of the data portion. The receiver could receive the data portion first until the end of the data flag is asserted. Then, the receiver can go into a SLEEP mode and stop receiving the parity portion. The FEC could adaptively be neglected or decoded by checking a quality measure of the received data (Cyclic Redundancy Check (CRC) in the case of DVB-H systems).

Figure 2:
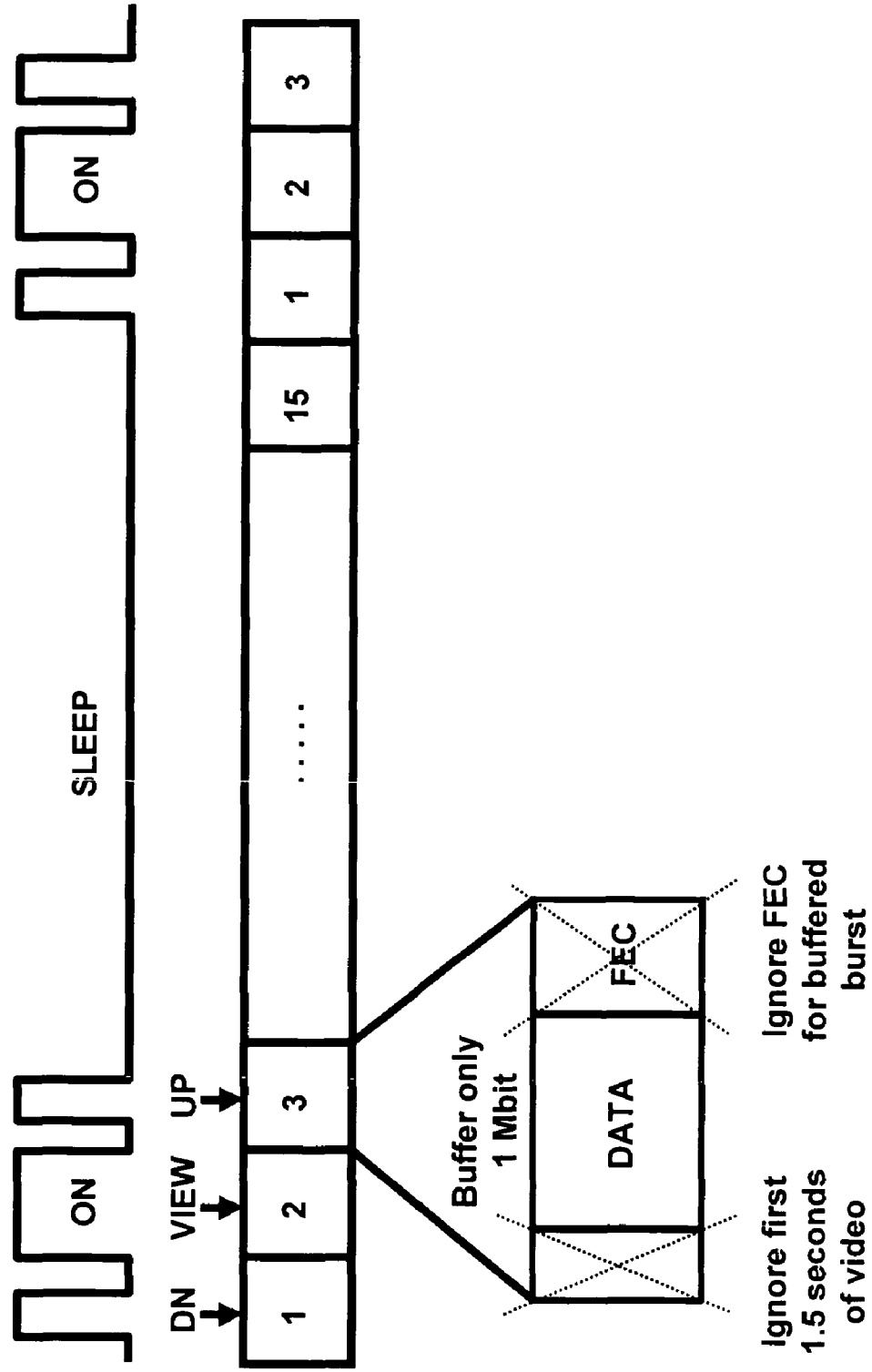
FIG. 2 is a schematic diagram illustrating buffer size and power consumption reduction by neglecting FEC and a first portion of data according to an embodiment herein.

The first portion of the burst data may be, for example, 0.5 Mbit. This first portion of the data corresponds to the first portion of the video carried in a given burst. Not buffering this portion of the video could correspond to a channel switching delay if the user switches to this particular buffered channel. This is because the first portion of the video will be missing. However, the neglected portion could be chosen such that the corresponding channel delay is within an acceptable range. If for example, 1.5 seconds of switching delay is acceptable and if a 2 Mbit burst of data carries 0.5 Mbit of FEC parity bits and 1.5 Mbit of video that corresponds to 5 seconds of video, the amount of neglected data could be given as 1.5 Mbit×1.5 sec/5 sec~0.5 Mbit. Thus, the receiver would need a buffer of only 1 Mbit×2=2 Mbit for channels UP and DN. The receiver power consumption is now two times the power consumption needed for the VIEW channel only. This is because the receiver needs to wake up only for double the duration of a single VIEW burst. This is illustrated in FIG. 2.

In a second embodiment, the receiver can save buffer size by sharing the memory that already exists in the receiver between the VIEW and UP channels. In DVB-H systems, decoding the VIEW channel generally requires 2 Mbit of memory (if more that one VIEW channel is being decoded, more memory is used in the receiver). The memory used for decoding the VIEW channel is usually required for a very short period of time (small fraction of a second). If the receiver empties this memory relatively quickly, it reuses it to buffer favorite channels that are received after the VIEW channel. In order to achieve this, the receiver implements a fast multiprotocol encapsulation forward error correction (MPE-FEC) decoder, such as that described in U.S. patent application Ser. No. 11/251,721, to reduce the time for the VIEW data to use the memory. Next, the receiver implements fast I/O circuits that are adapted to transfer the data to the video decoder buffer (which may be internal or external to the receiver) in a short period of time. Generally, the fast I/O circuits are adapted to transfer data in and out of the mobile TV receiver, and may be embodied as a secured digital input/output (SDIO) card, for example. Moreover, the fast I/O circuits are adapted to be able to empty the receiver memory at a faster rate than the rate of the received data (for example, 30 Mbps for DVB-H systems).

Figure 3:
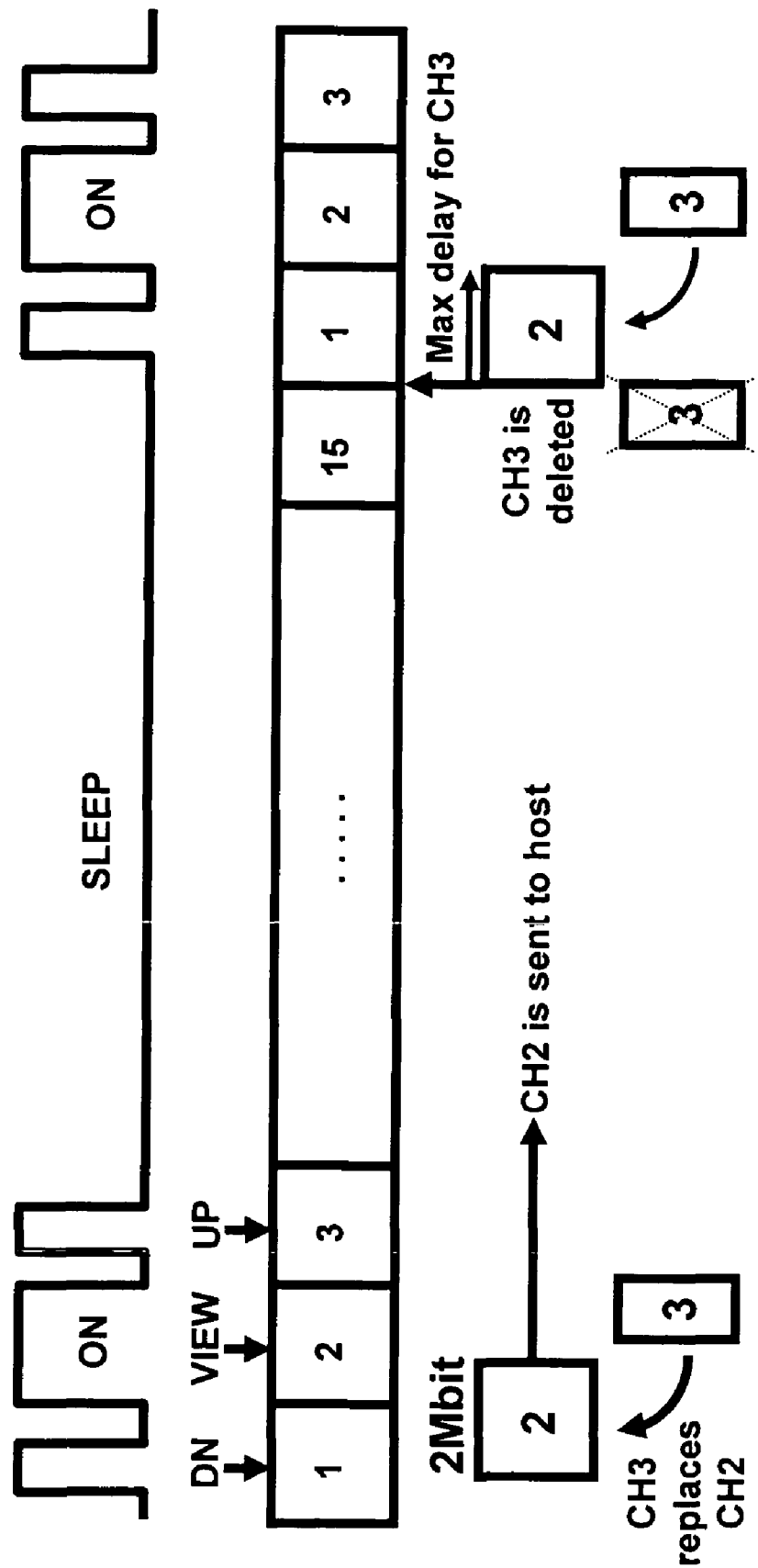
FIG. 3 is a schematic diagram illustrating buffer size reduction by sharing memory between the VIEW and UP channel according to an embodiment herein.

FIG. 3 shows an example in which a 2 Mbit memory used for decoding the VIEW channel (CH2) is shared with a favorite UP channel (CH3). Here, CH3 replaces CH2 after CH2 is decoded and transferred out of the 2 Mbit buffer. CH3 data is stored in the buffer until another burst of CH2 emerges and replaces CH3. The maximum delay for switching to CH3 is now greatly reduced.

A third embodiment provides for a smart channel allocation at the transmitter. As previously described, if the DN, VIEW, and UP channels are back-to-back in the channel line up, then the UP channel (which comes right after the VIEW channel) has the least channel switching delay as it can share memory with the VIEW channel for most of the time and thus does not need any extra buffer. However, the DN channel (which comes right before the VIEW channel) does not share the buffer with the VIEW channel and thus it suffers the worst channel switching delay if no extra buffer is added.

Figure 4:
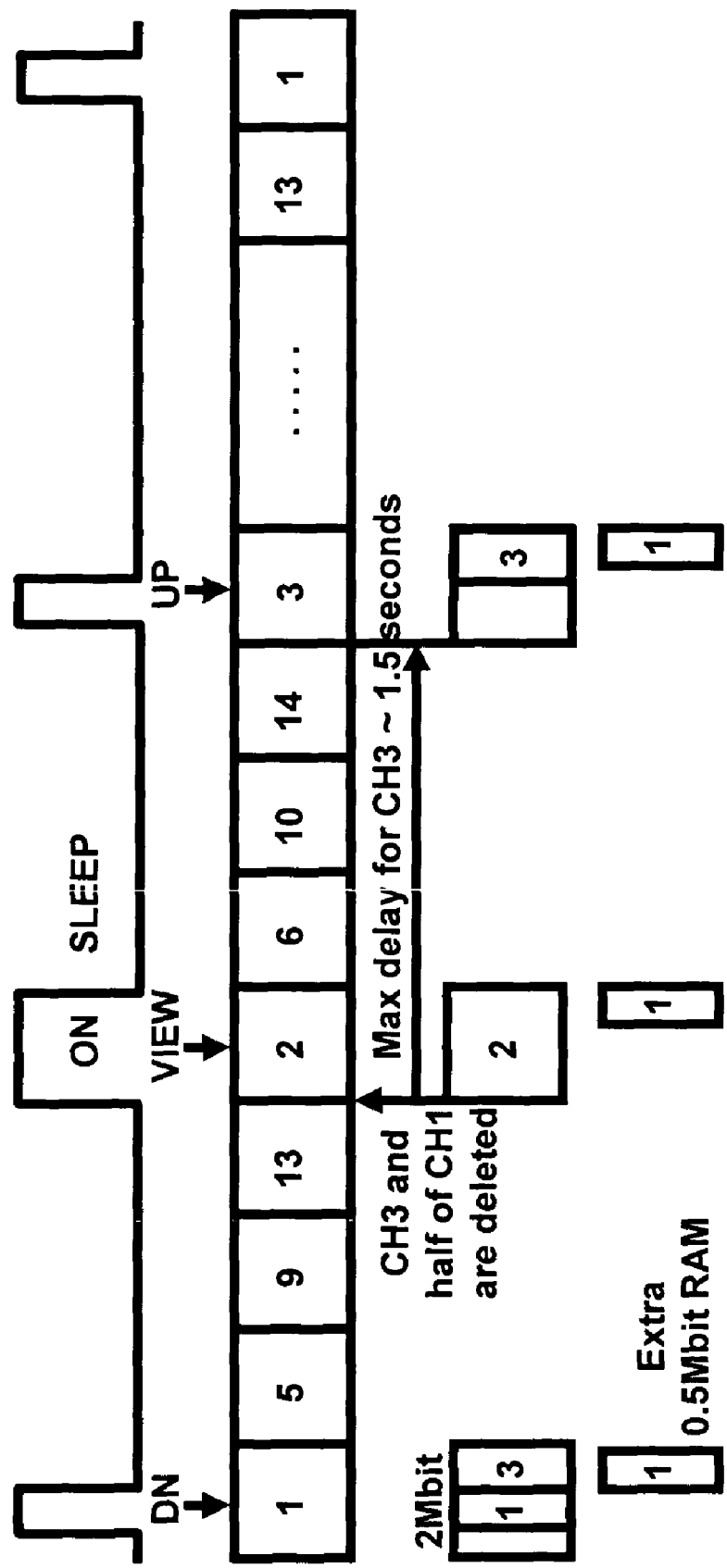
FIG. 4 is a schematic diagram illustrating smart channel allocation according to an embodiment herein.
Figure 5:
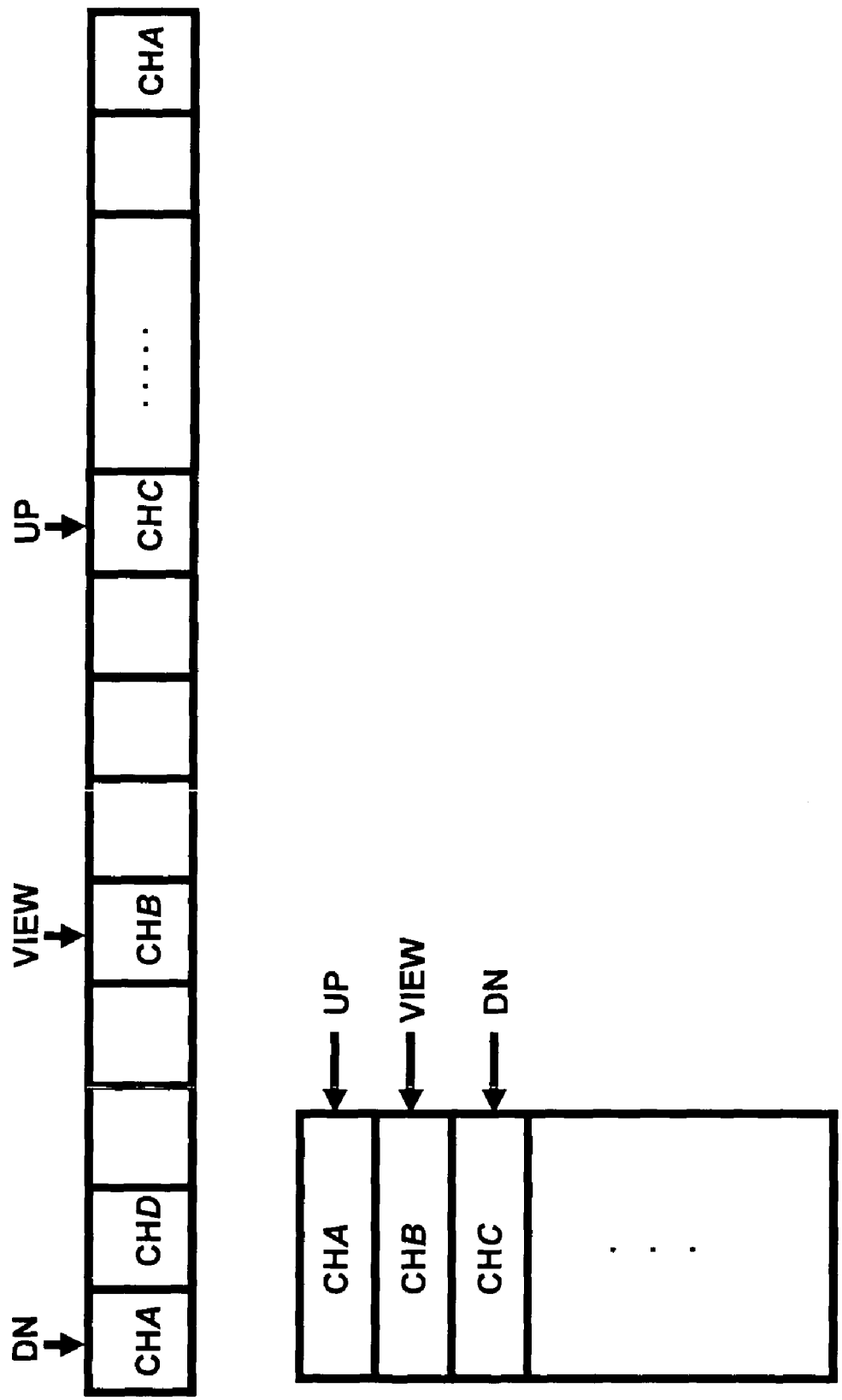
FIG. 5 is a schematic diagram illustrating a smart program guide according to an embodiment herein.

To equalize the channel switching delay between the UP and DN channels, they should be equally spaced from the VIEW channel as shown in FIG. 4. Here, the transmitter equally allocates spaced time slots from CH2 to CH1 and CH3. In this manner, the channel switching delay is uniform among the two most likely channels to switch to. If CH1 and CH3 are equally spaced in time from CH2, they can share the VIEW channel buffer for an equal amount of time before they are replaced by CH2. Thus, the extra memory needed for channel buffering is reduced to approximately 0.5 Mbit as shown in FIG. 4.

FIG. 4 illustrates a way of lining up channels such that the UP and DN channels are equally spaced from the VIEW channel for every channel. Such smart channel allocation requires control of the transmitter which might not always be possible. One way for the receiver to control the channel switching time is demonstrated in FIG. 5, which according to a fourth embodiment is referred to as a smart program guide. The receiver presents the program guide to a user in such that the channels that are equally spaced from the VIEW channel are channels UP and DN in the program guide regardless of the original channel line up.

Figure 6:
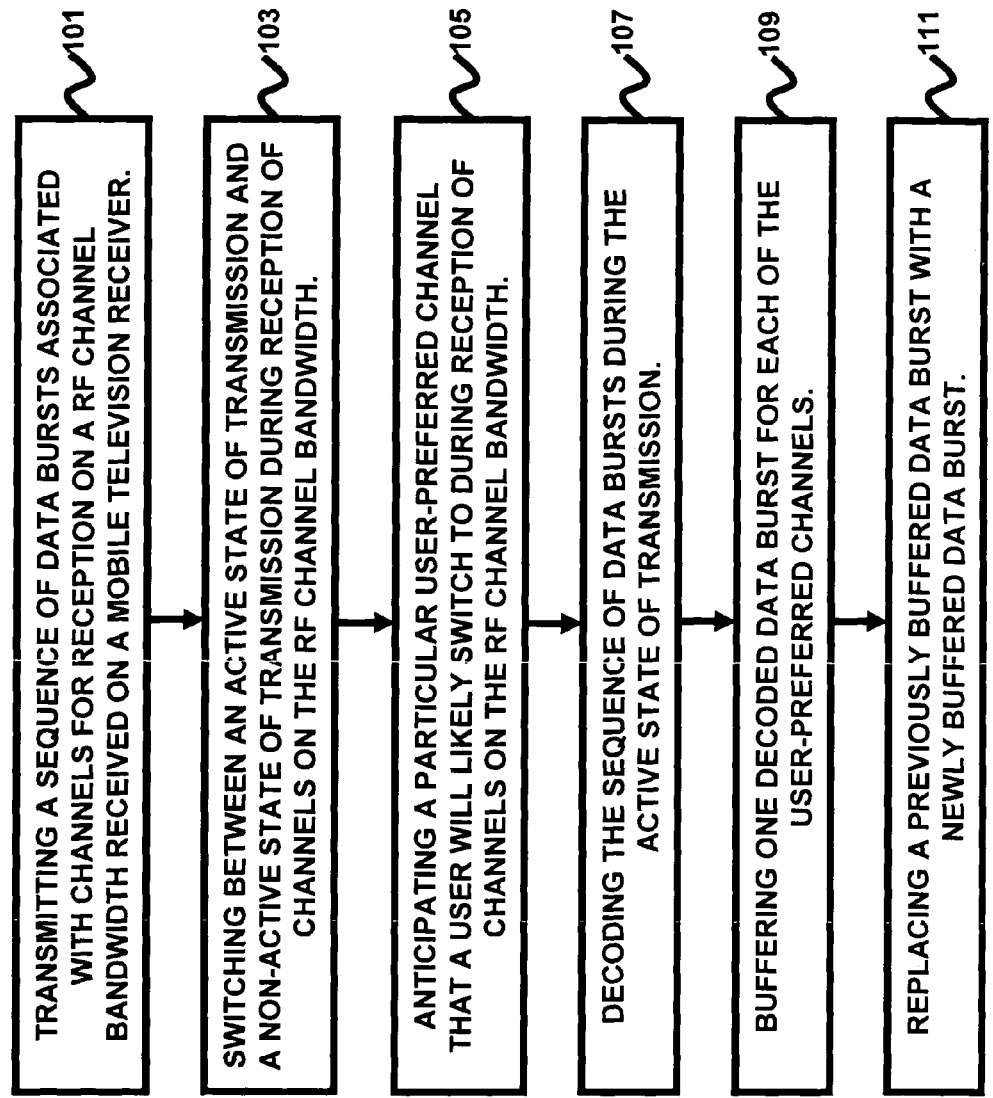
FIG. 6 is a flow diagram illustrating a preferred method of an embodiment herein.

FIG. 6, with reference to FIGS. 1 through 5, illustrates a flow diagram of a method of reducing a channel switching delay in TDM mobile television systems according to an embodiment herein, wherein the method comprises transmitting (101) a sequence of data bursts associated with channels for reception on a RF channel bandwidth received on a mobile television receiver; switching (103) between an active state of transmission and a non-active state of transmission during reception of channels on the RF channel bandwidth, wherein the active state of transmission comprises transmission of data bursts associated with user-preferred channels and the non-active state of transmission comprises transmission of data bursts associated with user non-preferred channels; anticipating (105) a particular user-preferred channel that a user will likely switch to during reception of channels on the RF channel bandwidth; decoding (107) the sequence of data bursts during the active state of transmission; buffering (109)

one decoded data burst for each of the user-preferred channels; and replacing (111) a previously buffered data burst with a newly buffered data burst.

The buffering of the one decoded data burst for each of the user-preferred channels is preferably performed internal to the mobile television receiver. The buffering of the one decoded data burst for each of the user-preferred channels is preferably performed external to the mobile television receiver. The method may further comprise neglecting parity data bursts in the sequence of data bursts during the buffering process. Preferably, the parity data bursts are used in a forward error correction (FEC) process for removing errors from transmitted video received in the mobile television receiver. Also, the method may further comprise neglecting a first portion of each the data bursts during the buffering process.

The method may further comprise sharing existing memory storage in the mobile television receiver between a currently viewed channel and an immediately subsequent sequenced channel. Additionally, the method may further comprise using a Reed Solomon (RS) decoder and an input/output (I/O) circuit to empty the memory storage to enable memory sharing between the currently viewed channel and the immediately subsequent sequenced channel. Moreover, the method may further comprise using a multiprotocol encapsulation forward error correction (MPE-FEC) process on data associated with the currently viewed channel to utilize memory resources of the mobile television receiver; and transferring the data to a video decoder buffer external to the mobile television receiver. Also, the method may further comprise allocating equally spaced time slots between a currently viewed channel and each of an immediately subsequent sequenced channel and an immediately preceding sequenced channel.

The embodiments herein can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
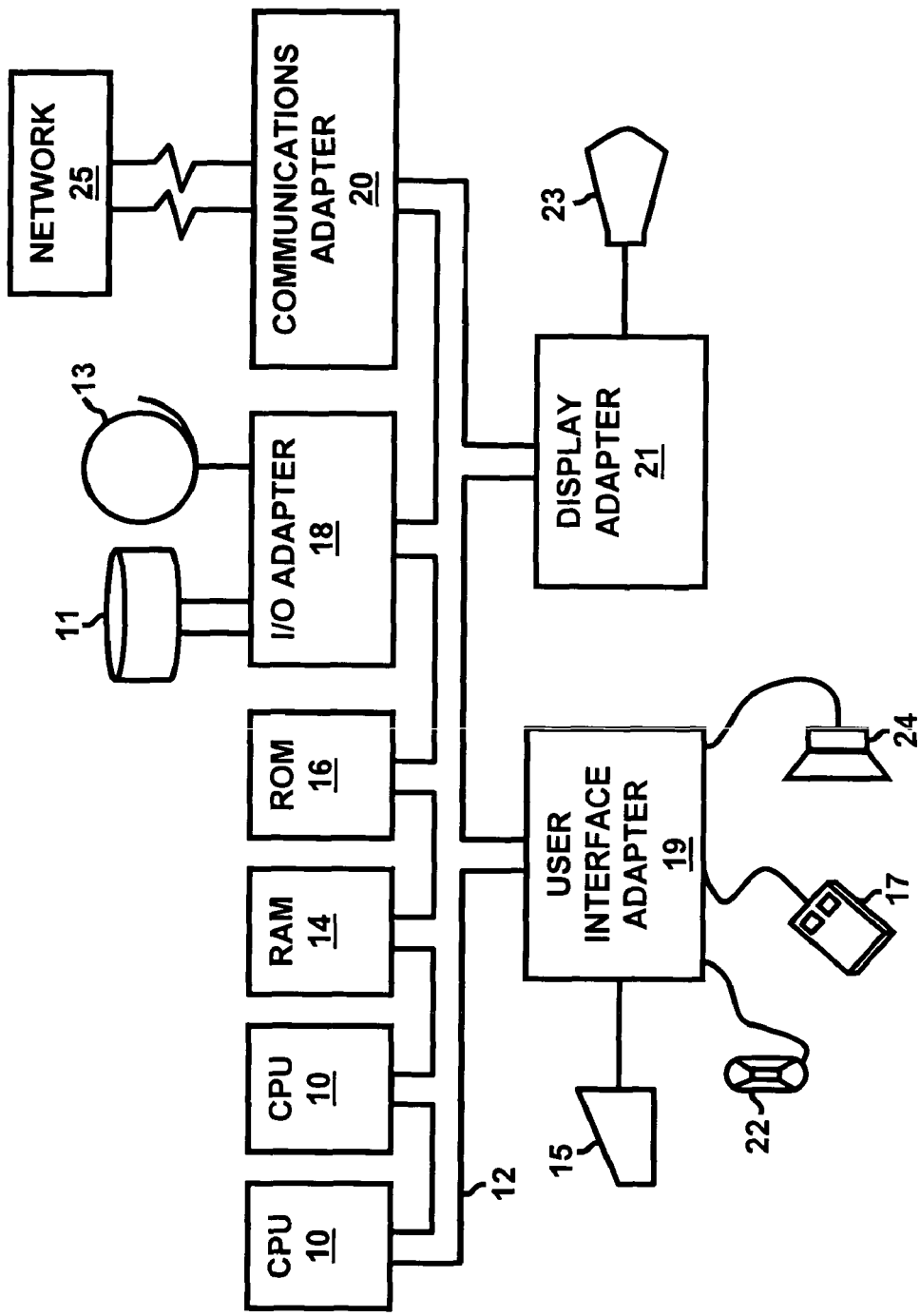
FIG. 7 is a computer hardware diagram according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 8:
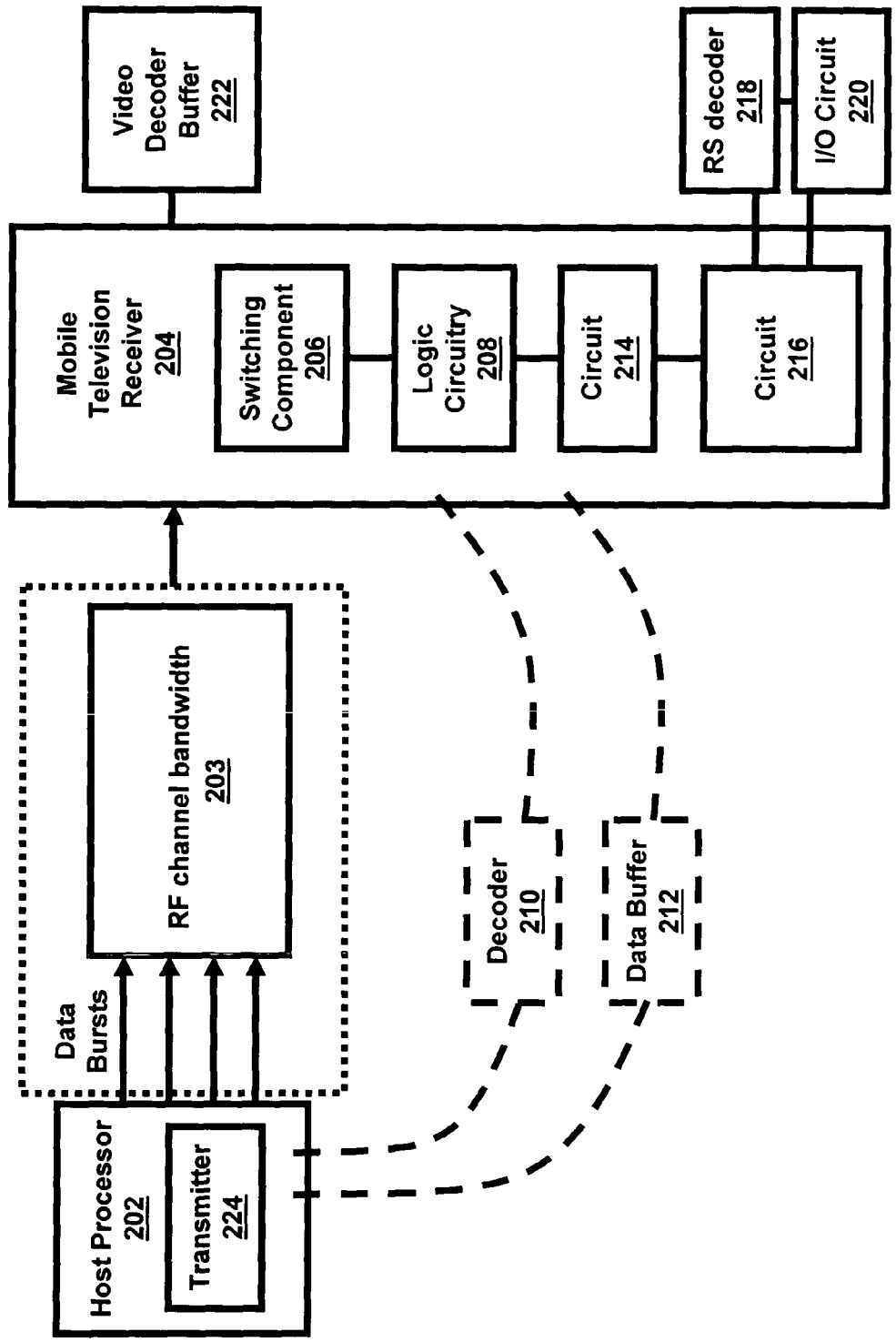
FIG. 8 illustrates a system diagram according to an embodiment herein.
Figure 8:
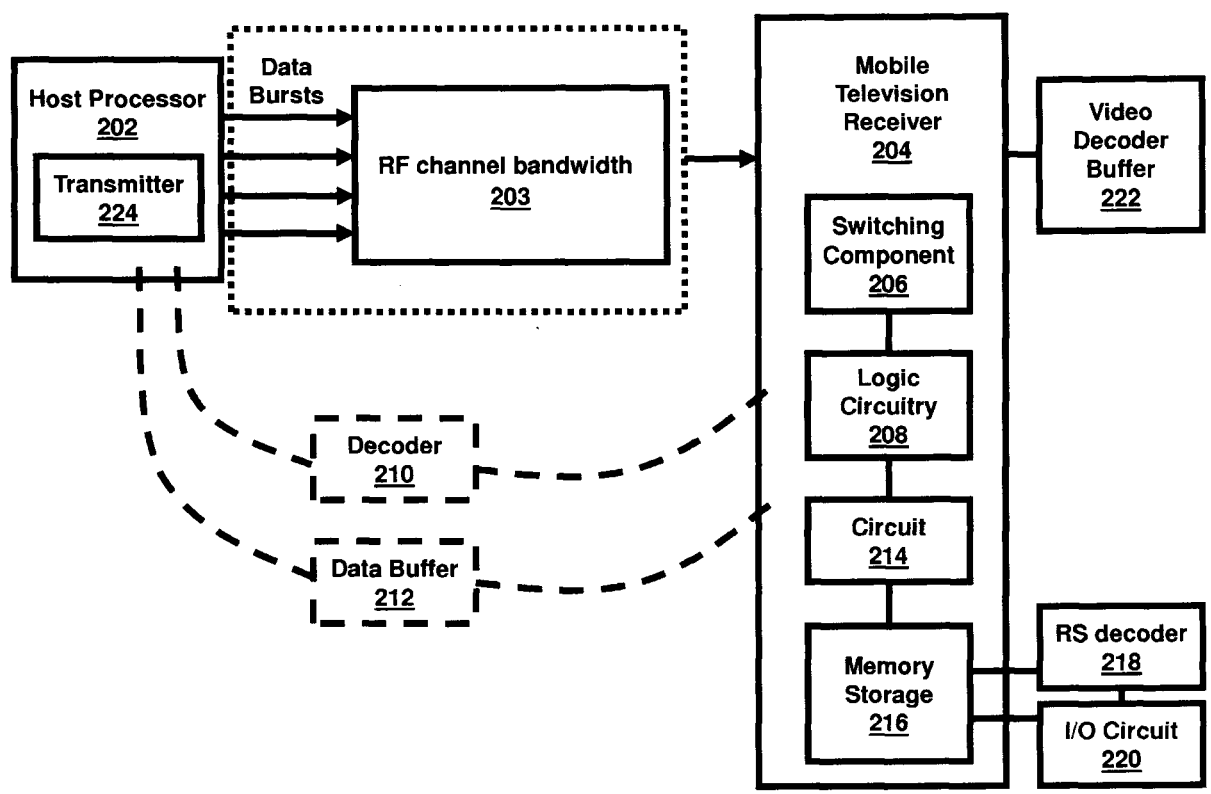

FIG. 8 illustrates a system 200 for of reducing a channel switching delay in a TDM mobile television, wherein the system 200 comprises a host processor 202 adapted to transmit a sequence of data bursts associated with channels for reception on a radio frequency (RF) channel bandwidth 203; a mobile television receiver 204 adapted to receive the sequence of data bursts and the RF channel bandwidth 203; a switching component 206 in the mobile television receiver 204, wherein the switching component 206 is adapted to switch between an active state of transmission and a non-active state of transmission during reception of channels on the RF channel bandwidth 203, wherein the active state of transmission comprises transmission of data bursts associated with user-preferred channels and the non-active state of transmission comprises transmission of data bursts associated with user non-preferred channels; logic circuitry 208 in the mobile television receiver 204, wherein the logic circuitry 208 is adapted to anticipate a particular user-preferred channel that a user will likely switch to during reception of channels on the RF channel bandwidth 203; a decoder 210 in one of the host processor 202 and the mobile television receiver 204, wherein the decoder 210 is adapted to decode the sequence of data bursts during the active state of transmission; a data buffer 212 in one of the host processor 202 and the mobile television receiver 204, wherein the data buffer 212 is adapted to buffer one decoded data burst for each of the user-preferred channels; and a circuit 214 in the mobile television receiver 204, wherein the circuit 214 is adapted to replace a previously buffered data burst with a newly buffered data burst.

Preferably, the data buffer 212 is adapted to neglect parity data bursts in the sequence of data bursts. Furthermore, the parity data bursts are preferably used in a FEC process for removing errors from transmitted video received in the mobile television receiver 204. Moreover, the data buffer 212 may be adapted to neglect a first portion of each of the data bursts during the buffering process. Additionally, the mobile television receiver 204 may be adapted to share existing memory storage 216 in the mobile television receiver 204 between a currently viewed channel (VIEW) and an immediately subsequent sequenced channel (for example, UP or DN).

The system 200 may further comprise a RS decoder 218 and an I/O circuit 220 adapted to empty the memory storage 216 to enable memory sharing between the currently viewed channel (VIEW) and the immediately subsequent sequenced channel (for example, UP or DN). Preferably, the mobile television receiver 204 is adapted to use a MPE-FEC process on data associated with the currently viewed channel (VIEW) to utilize memory resources of the mobile television receiver 204; and transfer the data to a video decoder buffer 222 external to the mobile television receiver 204. Preferably, the host processor 202 comprises a transmitter 224 adapted to allocate equally spaced time slots between a currently viewed channel (VIEW) and each of an immediately subsequent sequenced channel (for example, UP) and an immediately preceding sequenced channel (for example, DN).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of reducing a channel switching delay in time division multiplexing (TDM) mobile television systems, said method comprising:
    transmitting a sequence of data bursts associated with channels for reception on a radio frequency (RF) channel bandwidth received on a mobile television receiver, wherein said data bursts associated with channels comprise user-preferred channels and non-preferred channels;
    switching between an active state of transmission and a non-active state of transmission during reception of channels on said RF channel bandwidth, wherein said active state of transmission comprises transmission of data bursts associated only with user-preferred channels and said active state comprises enabling said mobile television receiver to receive said user-preferred channels, and wherein said non-active state of transmission comprises transmission of data bursts associated with user non-preferred channels and said non-active state comprises disabling said mobile television receiver;
    anticipating a particular user-preferred channel that a user will likely switch to during reception of channels on said RF channel bandwidth;
    decoding said sequence of data bursts only during said active state of transmission;
    buffering one decoded data burst for each of said user-preferred channels;
    neglecting parity data bursts in said sequence of data bursts during the buffering process;
    neglecting a first portion of each said data bursts during the buffering process;
    replacing a previously buffered data burst with a newly buffered data burst;
    sharing existing memory storage in said mobile television receiver between a currently viewed channel and an immediately subsequent sequenced channel;
    using a Reed Solomon (RS) decoder and an input/output (I/O) circuit to empty said memory storage to enable memory sharing between said currently viewed channel and said immediately subsequent sequenced channel;
    using a multiprotocol encapsulation forward error correction (MPE-FEC) process on data associated with said currently viewed channel to utilize memory resources of said mobile television receiver;
    transferring said data to a video decoder buffer external to said mobile television receiver; and
    allocating equally spaced time slots from said currently viewed channel to a combination of:
        said currently viewed channel;
        an immediately subsequent sequenced user-preferred channel; and
        an immediately preceding sequenced user-preferred channel to make channel switching delay uniform.

2. The method of claim 1, wherein the buffering of said one decoded data burst for each of said user-preferred channels is performed internal to said mobile television receiver.

3. The method of claim 1, wherein the buffering of said one decoded data burst for each of said user-preferred channels is performed external to said mobile television receiver.

4. The method of claim 1, wherein said parity data bursts are used in a forward error correction (FEC) process for removing errors from transmitted video received in said mobile television receiver.

5. A computer comprising a program of instructions executable by said computer to perform a method of reducing a channel switching delay in time division multiplexing (TDM) mobile television systems, said method comprising:
    transmitting a sequence of data bursts associated with channels for reception on a radio frequency (RF) channel bandwidth received on a mobile television receiver, wherein said data bursts associated with channels comprise user-preferred channels and non-preferred channels;
    switching between an active state of transmission and a non-active state of transmission during reception of channels on said RF channel bandwidth, wherein said active state of transmission comprises transmission of data bursts associated only with user-preferred channels and said active state comprises enabling said mobile television receiver to receive said user-preferred channels, and wherein said non-active state of transmission comprises transmission of data bursts associated with user non-preferred channels;
    anticipating a particular user-preferred channel that a user will likely switch to during reception of channels on said RF channel bandwidth;
    decoding said sequence of data bursts during said active state of transmission;
    buffering one decoded data burst for each of said user-preferred channels;
    neglecting parity data bursts in said sequence of data bursts during the buffering process;
    neglecting a first portion of each said data bursts during the buffering process;
    replacing a previously buffered data burst with a newly buffered data burst;

sharing existing memory storage in said mobile television receiver between a currently viewed channel and an immediately subsequent sequenced channel;

using a Reed Solomon (RS) decoder and an input/output (I/O) circuit to empty said memory storage to enable memory sharing between said currently viewed channel and said immediately subsequent sequenced channel;

using a multiprotocol encapsulation forward error correction (MPE-FEC) process on data associated with said currently viewed channel to utilize memory resources of said mobile television receiver;

transferring said data to a video decoder buffer external to said mobile television receiver; and allocating equally spaced time slots from said currently viewed channel to a combination of:
- said currently viewed channel;
- an immediately subsequent sequenced user-preferred channel; and
- an immediately preceding sequenced user-preferred channel to make channel switching delay uniform.

6. The computer of claim 5, wherein the buffering of said one decoded data burst for each of said user-preferred channels is performed internal to said mobile television receiver.

7. The computer of claim 5, wherein the buffering of said one decoded data burst for each of said user-preferred channels is performed external to said mobile television receiver.

8. The computer of claim 5, wherein said parity data bursts are used in a forward error correction (FEC) process for removing errors from transmitted video received in said mobile television receiver.

9. A system for reducing a channel switching delay in a time division multiplexing (TDM) mobile television, said system comprising:

a host processor adapted to transmit a sequence of data bursts associated with channels for reception on a radio frequency (RF) channel bandwidth;

a mobile television receiver adapted to receive said sequence of data bursts and said RF channel bandwidth, wherein said data bursts comprise user-preferred channels and non-preferred channels;

a switching component in said mobile television receiver, wherein said switching component is adapted to switch between an active state of transmission and a non-active state of transmission during reception of channels on said RF channel bandwidth, wherein said active state of transmission comprises transmission of data bursts associated only with user-preferred channels and said active state comprises enabling said mobile television receiver to receive said user-preferred channels, and wherein said non-active state of transmission comprises transmission of data bursts associated with user non-preferred channels;

logic circuitry in said mobile television receiver, wherein said logic circuitry is adapted to anticipate a particular user-preferred channel that a user will likely switch to during reception of channels on said RF channel bandwidth;

a decoder in one of said host processor and said mobile television receiver, wherein said decoder is adapted to decode said sequence of data bursts during said active state of transmission;

a data buffer in one of said host processor and said mobile television receiver, wherein said data buffer is adapted to buffer one decoded data burst for each of said user-preferred channels, wherein said data buffer is adapted to neglect parity data bursts in said sequence of data bursts, and wherein said data buffer is adapted to neglect a first portion of each said data bursts during the buffering process;

a circuit in said mobile television receiver, wherein said circuit is adapted to replace a previously buffered data burst with a newly buffered data burst, wherein said mobile television receiver is adapted to share existing memory storage in said mobile television receiver between a currently viewed channel and an immediately subsequent sequenced channel; and a Reed Solomon (RS) decoder and an input/output (I/O) circuit adapted to empty said memory storage to enable memory sharing between said currently viewed channel and said immediately subsequent sequenced channel, wherein said mobile television receiver is adapted to:
- use a multiprotocol encapsulation forward error correction (MPE-FEC) process on data associated with said currently viewed channel to utilize memory resources of said mobile television receiver; and
- transfer said data to a video decoder buffer external to said mobile television receiver, and wherein said host processor comprises a transmitter adapted to allocate equally spaced time slots from said currently viewed channel to a combination of:
- said currently viewed channel;
- an immediately subsequent sequenced user-preferred channel; and
- an immediately preceding sequenced user-preferred channel to make channel switching delay uniform.

10. The system of claim 9, wherein said parity data bursts are used in a forward error correction (FEC) process for removing errors from transmitted video received in said mobile television receiver.

\* \* \* \* \*

UNITED STATES PATENT AND TRADEMARK OFFICE
CERTIFICATE OF CORRECTION

PATENT NO. : 7,950,042 B2
APPLICATION NO. : 11/303398
DATED : May 24, 2011
INVENTOR(S) : Nabil Yousef It is certified that error appears in the above-identified patent and that said Letters Patent is hereby corrected as shown below:

In drawing sheet 8 of 8 corresponding to FIG. 8, please amend element block number 216 by deleting "Circuit" and in its place, please insert --Memory Storage-- as attached.

Signed and Sealed this
Twelfth Day of February, 2013

Teresa Stanek Rea
*Acting Director of the United States Patent and Trademark Office*